United States Patent [19]
Patterson

[11] Patent Number: 5,628,886
[45] Date of Patent: *May 13, 1997

[54] ELECTROLYTIC SYSTEM FOR HEATING A LIQUID ELECTROLYTE

[76] Inventor: James A. Patterson, 2074 20th St., Sarasota, Fla. 34234

[*] Notice: The term of this patent shall not extend beyond the expiration date of Pat. No. 5,494,559.

[21] Appl. No.: 599,140

[22] Filed: Feb. 9, 1996

[51] Int. Cl.$^6$ .................. C25B 9/00; C25B 11/03; C25B 11/08; C25B 15/08
[52] U.S. Cl. .................. 204/241; 204/275; 204/284; 204/274
[58] Field of Search .................. 204/241, 274, 204/273, 275, 239, 284

[56] References Cited

U.S. PATENT DOCUMENTS

| | | | |
|---|---|---|---|
| 1,023,545 | 4/1912 | Bates et al. | 204/236 X |
| 2,915,406 | 12/1959 | Rhoda et al. | 427/436 |
| 3,632,496 | 1/1972 | Patterson | 204/249 |
| 3,888,756 | 6/1975 | Teshima et al. | 204/275 |
| 4,152,238 | 5/1979 | Okazaki | 204/241 X |
| 4,206,018 | 6/1980 | Kreisel et al. | 204/241 X |
| 4,269,689 | 5/1981 | Agladze | 204/268 |
| 4,316,786 | 2/1982 | Yu et al. | 204/223 |
| 4,913,779 | 4/1990 | Lacoste | 205/348 |
| 4,943,355 | 7/1990 | Patterson | 205/151 |
| 5,036,031 | 7/1991 | Patterson | 502/10 |
| 5,273,635 | 12/1993 | Gernert et al. | 204/241 |
| 5,318,675 | 6/1994 | Patterson | 205/628 |
| 5,372,688 | 12/1994 | Patterson | 204/222 |
| 5,494,559 | 2/1996 | Patterson | 204/273 X |

*Primary Examiner*—Donald R. Valentine
*Attorney, Agent, or Firm*—Charles J. Prescott

[57] ABSTRACT

An electrolytic system for heating water containing a conductive salt in solution. An electrolytic cell in the system includes a non-conductive housing having an inlet and an outlet and spaced apart first and second conductive foraminous grids positioned within the housing. A plurality of conductive particles each including a conductive metal which is readily combineable with hydrogen or an isotope of hydrogen to form a metallic hydride are positioned within the housing in electrical contact with the first grid adjacent the inlet. An electric power source in the system is initially operably connected across the first and second grids whereby electrical current flows between the grids within the water solution to charge the system after which the system is self-sustaining.

14 Claims, 1 Drawing Sheet

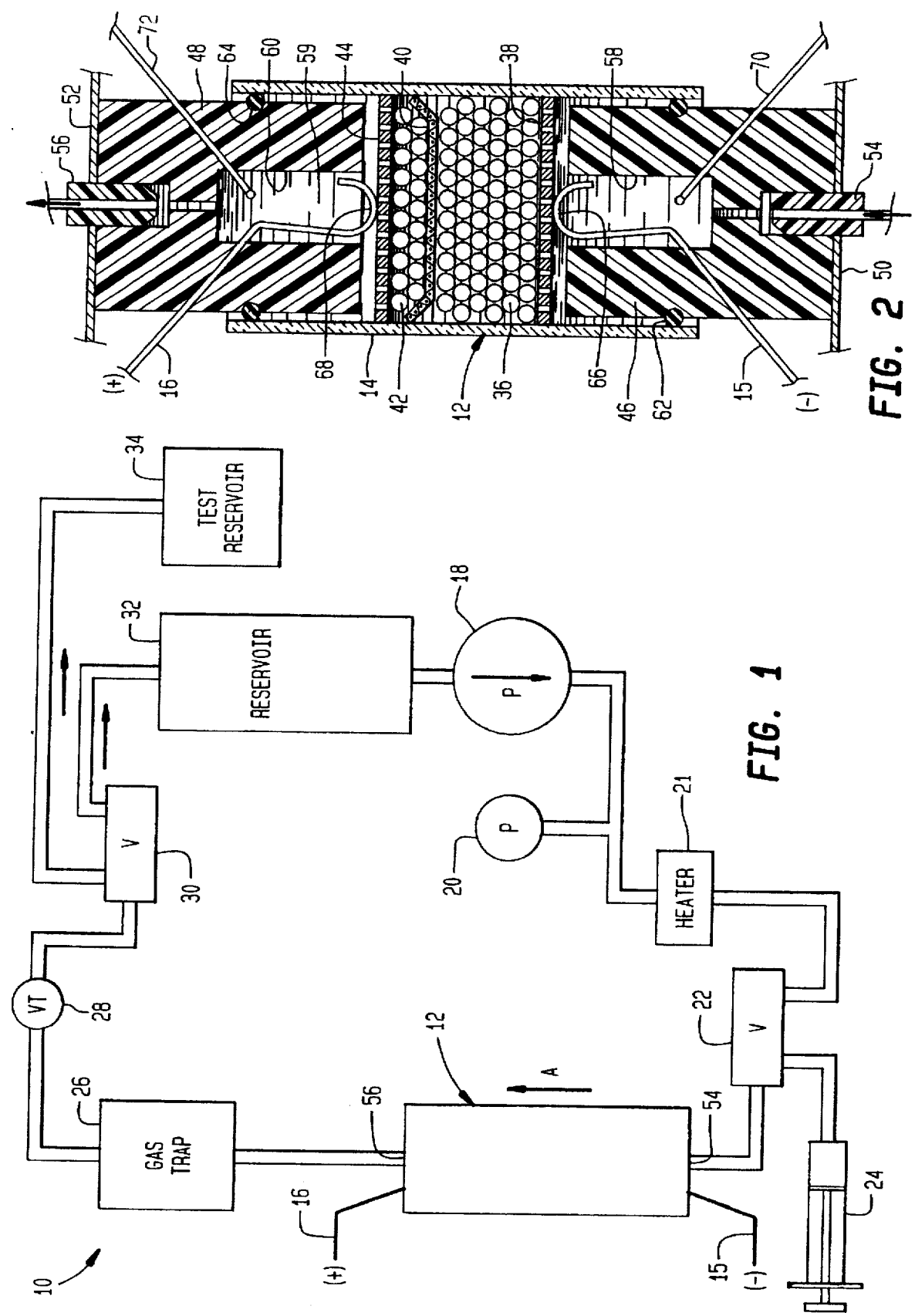

ELECTROLYTIC SYSTEM FOR HEATING A LIQUID ELECTROLYTE

BACKGROUND OF THE INVENTION

1. Scope of Invention

This invention generally relates to electrolytic cells, and more particularly to an improved electrolytic system for the production of heat in a liquid electrolyte.

2. Prior Art

The present invention utilizes and improves upon microspheres formed of non-metallic beads which are plated with a uniformly thick coating of palladium. These palladium coated microspheres are taught in my previous U.S. Pat. Nos. 4,943,355 and 5,036,031. In these above-recited previous patents, cross linked polymer microspheres forming an inner core and having a plating of palladium thereatop are taught to exhibit improvements in the absorption of hydrogen and isotopes of hydrogen. Utilizing these catalytic microspheres led to my later U.S. Pat. Nos. 5,318,675 ('675) and 5,372,688 ('688) (incorporated herein by reference) which teach an electrolytic cell, system and method for, inter alia, producing heat.

The use of a palladium sheet to form one electrode within an electrolytic cell to produce excess heat, the electrolytic cell being a Pons-Fleischmann-type, is taught by Edmund Storms. The description of the Storms electrolytic cell and his experimental performance results are described in an article entitled *Measurements of Excess Heat from a Pons-Fleischmann-Type Electrolytic Cell Using Palladium Sheet* appearing in Fusion Technology, Volume 3, March 1993. In a previous article, Storms reviewed experimental observations about electrolytic cells for producing heat in an article entitled *Review of Experimental Observations About the Cold Fusion Effect* in FUSION TECHNOLOGY, Vol. 20, December 1991.

None of the previously reported experimental results or other prior art devices known to applicant other than my U.S. '675 and '688 patents have utilized or disclosed non-conductive copolymeric beads of palladium coated (or any substitute metal which will form "metallic hydrides" in the presence of hydrogen) conductive microspheres within an electrolytic cell for the production of heat and the electrolysis of water into its hydrogen and oxygen components.

The present invention discloses the heretofore unexpected self-sustaining nature of my previous work and all of the electrolytic cells and systems above described. Up to the present invention, it was believed that these previously described systems of mine required the continual current input across the bed of active metallic beads within the cell of the system. However, it has now been discovered as disclosed in this application that, by suitable triggering of the catalytic reaction wherein excess heat is produced, the current across the active bead bed within the cell may be eliminated whereby the cell continues to produce a differential temperature in the electrolyte passing therethrough.

BRIEF SUMMARY OF THE INVENTION

This invention is directed to an electrolytic system for self-sustained heating of water containing a conductive salt in solution. An electrolytic cell in the system includes a non-conductive housing having an inlet and an outlet and spaced apart first and second conductive foraminous grids positioned within the housing. A plurality of conductive particles each formed of a conductive metal in various shapes and sizes only having the requirement of being readily combineable with hydrogen or an isotope of hydrogen to form a metallic hydride or deuteride are positioned within the housing in electrical contact with the first grid adjacent the inlet. An electric power source in the system is initially operably connected across the first and second grids whereby electrical current flows between the grids within the water or heavy water solution, after which electric current is interrupted and the system becomes self-sustaining.

It is therefore an object of this invention to utilize an electrolytic cell as previously disclosed in my '675 and '688 patents in combination with conductive metallic particles as a catalyst which form a metallic hydride or deuteride in the presence of hydrogen to produce heat.

It is yet another object of this invention to provide an improved electrolytic cell for the self-sustained production of heat in the form of heated water or heavy water-based liquid electrolyte flowing through the cell.

It is yet another object of this invention to utilize conductive particles in an electrolytic cell, the metal chosen from one of those which exhibit strong hydrogen absorption properties to form "metallic hydrides".

It is still another object of this invention to provide an improved electrolytic cell for the production of heat within an electrolytic cell, the cell utilizing conductive particles of either uniform or irregular shape and uniform or non-uniform size, the metal chosen from one of those which exhibits strong hydrogen absorption properties to form a metallic hydride or deuteride.

In accordance with these and other objects which will become apparent hereinafter, the instant invention will now be described with reference to the accompanying drawings.

BRIEF DESCRIPTION OF THE DRAWINGS

FIG. 1 is a schematic view of an experimental system embodying the present invention.

FIG. 2 is a section view of the electrolytic cell shown in FIG. 1.

DETAILED DESCRIPTION OF THE INVENTION

My prior U.S. Pat. No. 5,318,675 (U.S. '675) and 5,372,688 (U.S. '688) and the teachings contained therein are hereby incorporated by reference.

Referring now to the drawings, a system embodying concepts of the invention utilized during testing procedures is shown generally at numeral 10. This system 10 includes an electrolytic cell shown generally at numeral 12 interconnected at each end with a closed loop electrolyte circulation system. The circulation system includes a constant volume pump 18 which draws a liquid electrolyte 59 from a reservoir 32 and forces the electrolyte 59 in the direction of the arrow into inlet 54 of electrolytic cell 12. After the electrolytic cell 12 is completely filled with the electrolyte 59, the fluid then exits an outlet 56, thereafter flowing into a gas trap 26 which is provided to separate hydrogen and oxygen gas from the electrolyte 59 when required. A throttle valve 28 downstream of the gas trap 26 regulates the electrolyte flow so as to also regulate the fluid pressure within the electrolytic cell 12 as monitored by pressure gauge 20.

A slide valve 22 provides for the intermittent introduction of ingredients into the liquid electrolyte 59 via syringe 24. A second slide valve 30 provides for the periodic removal of electrolyte 59 into test reservoir 34 for analysis to determine correct electrolyte make-up.

In FIG. 2, the details of the electrolytic cell 12 utilized during testing procedures is there shown. A cylindrical glass non-conductive housing 14, open at each end, includes a moveable non-conductive end member 46 and 48 at each end thereof. These end members 46 and 48 are sealed within the housing 14 by O-rings 62 and 64. The relative spacing between these end members 46 and 48 is controlled by the movement of end plates 50 and 52 thereagainst.

Also shown in FIG. 2 is an in-line heater 21 disposed between the pressure gauge 20 and the slide valve 22. This heater 21 is provided to heat the electrolyte liquid as it flows through the system 10 and the cell 12. Note importantly that the heater 21 may be positioned anywhere in the closed system electrolyte flow path as the heating applied is of a steady state nature rather than only a pre-heating condition of the electrolyte, although positioning of the heater 21 is preferred to be adjacent the inlet 54 of the cell 12 for better liquid electrolyte temperature control. The heating of the electrolyte external to the cell 12 is one means for triggering the catalytic reaction within the cell 12 to produce a positive temperature differential ($\Delta T$) of the electrolyte as it flows through the cell 12. Another mean for triggering this heat production reaction between the electrolyte and the beads or particles 36 is by the application of sufficient electric d.c. current across electrodes 15 and 16 described herebelow.

Each of the end members 46 and 48 includes an inlet stopper 54 and an outlet stopper 56, respectively. Each of these stoppers 54 and 56 define an inlet and an outlet passage, respectively into and out of the interior volume, respectively, of the electrolytic cell 12. These end members 46 and 48 also include a fluid chamber 58 and 60, respectively within which are mounted electrodes 15 and 16, respectively, which extend from these chambers 58 and 60 to the exterior of the electrolytic cell 12 for interconnection to a constant current-type d.c. power supply (not shown) having its negative and positive terminals connected as shown. Also positioned within the chambers 58 and 60 are thermocouples 70 and 72 for monitoring the electrolyte temperature at these points of inlet and outlet of the electrolytic cell 12. However, in the experiments reported herebelow, the inlet temperature of the liquid electrolyte was measured just outside of the cell 12 immediately upstream of stopper 54 to more accurately reflect temperature differential ($\Delta T$).

A plurality of separate, packed conductive microspheres 36, preferably more broadly referred to as particles, are positioned to define a particle bed within housing 14 immediately adjacent and against a conductive foraminous or porous grid 38 formed of platinum and positioned transversely across the housing 14 as shown. These conductive particles 36 include a conductive metal which is readily combineable with hydrogen or an isotope of hydrogen to form a metallic hydride or deuteride. The size and shape of these conductive particles is now known to be of lesser significance so that variations in particle shape, including an irregular shape and size, are within the slope of this invention. Moreover, size or shape consistency is now known not to be a required limitation so that, for example, pure solid conductive metal granules form the active catalytic bases of one experimental embodiment described in my co-pending application, Ser. No. 08/591,277, filed Jan. 25, 1996 entitled "System and Electrolytic Cell Having Pure Metal Catalytic Elements for Heating a Liquid Electrolyte"

Still referring to FIG. 2, a non-conducive foraminous nylon mesh 40 is positioned against the other end of these conductive particles 36 so as to retain them in the position shown. Adjacent the opposite surface of this non-conductive mesh 40 is a plurality of non-conductive spherical microbeads, or more generally particles, 42 formed of cross-linked polystyrene and having a uniform diameter of about 1.0 mm. Against the other surface of this layer of non-conductive microspheres 42 is a conductive foraminous or porous grid 44 positioned transversely across the housing 14 as shown.

Should the system 10 boil off or otherwise inadvertently lose all liquid electrolyte within the cell 12, a means of preventing system shut-down is preferred which replaces the non-conductive microspheres 42 with non-metallic spherical cation ion exchange polymer conductive microbeads preferably made of cross-linked styrene divinyl benzene which have fully pre-sulfonated surfaces which have been ion exchanged with a lithium salt. This preferred non-metallic conductive microbead structure will thus form a "salt bridge" between the anode 44 and the conductive particles 36, the non-conductive mesh 40 having apertures sufficiently large to permit contact between the conductive particles 36 and the conductive non-metallic microbeads. The mesh size of mesh 40 is 200–500 micrometers. This preferred embodiment also prevents melting of the sulfonated non-conductive microbeads 42 while reducing cell resistance during high loading and normal operation.

The end of the electrode 15 is in electrical contact at 66 with conductive grid 38, while electrode 16 is in electrical contact at 68 with conductive grid 44 as shown. By this arrangement, when there is no electrolyte within the electrolytic cell 12, no current will flow between the electrodes 15 and 16.

ELECTROLYTE

When the electrolytic cell 12 is filled with a liquid electrolyte 59, current will flow between the electrodes 15 and 16. The preferred formulation for this electrolyte 59 is generally that of a conductive salt in solution with water. The preferred embodiment of water is that of either light water ($H_2^1O$) or heavy water and, preferably deuterium ($H_2^2O$). The purity of all of the electrolyte components is of utmost importance. The water ($H_2^2O$) and the deuterium ($H_2^2O$) must have a minimum resistance of one megohm with a turbidity of less than 0.2 n.t.u. This turbidity is controlled by ultra membrane filtration. The preferred salt solution is lithium sulfate ($Li_2SO_4$) in a 2-molar mixture with water and is of chemically pure quality. In general, although a lithium sulfate is preferred, other conductive salts chosen from the group containing boron, aluminum, gallium, and thallium, as well as lithium, may be utilized. The preferred pH or acidity of the electrolyte is 9.0.

CONDUCTIVE METAL BEADS/PARTICLES

Palladium coated microspheres were originally preferred as disclosed in U.S. Pat. Nos. '675 and '688 and as taught in my U.S. Pat. Nos. 4,943,355 and 5,036,031. Moreover palladium may be substituted by other transition metals, rare earths and also uranium. In general, any of these metals which are capable of combining with high volumes of hydrogen to form "metallic hydrides" are acceptable. These metals known to applicant which will serve as a substitute for palladium are lanthanum, praseodymium, cerium, titanium, zirconium, vanadium, tantalum, uranium, hafnium and thorium. Authority for the inclusion of these elements within this group is found in a book entitled *Inorganic Hydrides*, by B. L. Shaw, published by Pergammon Press, 1967. However, palladium is the best known and most widely studied metallic hydride and was utilized in my previously referenced patents to form conductive hydrogen-absorbing microspheres.

Other recent research by R. Mills in an article entitled *Excess Heat Production by the Electrolysis of Inequious Potassium Carbonate Electrolyte and the Implications for "Cold Fusion"* published in Fusion Technology 20 dated (1991) 65, suggests that nickel should be added to this category of metallic hydride or deuteride, forming metals for production of heat using an $H_2O$-based electrolyte. Support for the inclusion of nickel may also be drawn from my previous co-pending application Ser. No. 08/488,609, filed Jun. 8, 1995 entitled "System for Electrolysis and Heating of Water" in which a thin layer of nickel was deposited atop a uniform palladium layer plated around a spherical core. The nickel was presumed to add structural integrity only, but it is now believed that nickel will also interact with a water-based electrolyte to produce useful amounts of heat as well.

In an even more general sense, the broad requirement here is to provide a metallic hydride or deuteride forming particle in the presence of hydrogen, the exact shape and consistency in size being a secondary consideration so long as one of the conductive metals hereinabove described is used as a catalyst. In my previously referenced patents and inventive work with respect to metallic hydride forming coated microspheres, only cores formed of styrene divinyl benzene having a sulfonated surface had been utilized. However, experimental results leading to another of my co-pending patent applications filed Jan. 16, 1996, Ser. No. 08/586,164 entitled "System and Electrolytic Cell Having Inert Spherical Core Catalytic Elements for Heating a Liquid Electrolyte" utilizes a sufficiently broad range of core materials and surface finishes to lead to the conclusion that any spherical core which possesses the general characteristics of being "inert" may be utilized in conjunction with one or more of the combinations of metallic hydride forming coating materials applied thereatop. This application expands that concept still further. Inertness, in this context, identifies a very low tendency to interact with the liquid electrolyte within the cell to produce heat.

CELL RESISTANCE

In preparing the electrolytic cells for testing, the cell resistance was measured utilizing a Whetstone Bridge or an Ohm meter prior to the introduction of the electrolyte into the electrolytic cell. This cell resistance, when dry, should be infinitely high. Otherwise, a short between the anode screen and the cathode beads exists and the unit would have to be repacked. Prior to testing, with electrolyte present, the cell resistance was set at 16 ohms by appropriate compression of the end members.

RELATIVE SURFACE AREAS

The range in diameters of the conductive microspheres as above described is relatively broad, limited primarily by the ability to plate the inert cores and the economic factors involved therein. As a guideline, however, it has been determined that there exists a preferred range in the ratio between the total surface area of all of the conductive microspheres collectively within the electrolytic cell 12 and the inner surface area of the non-conductive housing, e.g. 14 in FIG. 2, which surrounds the bed of conductive microspheres. As in FIG. 2, this housing inner surface area would extend from the conductive foraminous grid 38 and the non-conductive mesh 40.

A minimum preferred ratio of the total bead surface area to the inner housing surface area is in the range of 5 to 1 (5:1). However, an ideal area ratio is 10 to 1 (10:1) and is typically utilized in the experiments reported herebelow. This ratio is thus affected primarily by the diameter of the conductive microspheres, the smaller the diameter of the microspheres, the higher the ratio becomes.

EXPERIMENTAL RESULTS

Experimental test procedures and results and graphic display of those results form my previous U.S. Pat. Nos. '674 and '688 are repeated by reference thereto. Similar tests with respect to the other forms of conductive microspheres described hereinabove were conducted which showed substantially above 100% heat outputs (yields), also referred to as "excess heat". Excess heat is more generally defined herein as the ratio (greater than 1.0) of heat energy output to electrical power input.

Table I herebelow represents a tabularization of actual test results performed on an electrolytic cell as shown in FIG. 2 using the above described generally spherical beads having an inner layer of nickel of 6–7 microns in thickness, an intermediate palladium layer of 1 micron thickness and an outer nickel layer of 0.5 microns thickness as shown at 36 of FIG. 2 to form the catalytic bed within the electrolytic cell 12. In general, all tabular results herebelow represent data taken in terms of elapsed time in minutes, change in temperature of the electrolyte between just upstream of the inlet 54 and the outlet 56 of the cell 12 ($\Delta T°C$), current flow in amps, voltage (V) across the electrolytic cell 12 between terminals and 16, the flow rate of the electrolyte (ml/min) and calculated watts in and watts out and percent yield. Percent yield is defined as the wattage output divided by the wattage input times 100%. In calculating watts in, the input voltage is reduced by 1.5 volts which represents the known voltage loss in electrolysizing $H_2O$, which energy is returned to the system in the recombination of $H_2$ and $O_2$ into $H_2O$.

Importantly note that, in Table I, the electrolyte was heated external to the cell approximately 20° C. which boosted the temperature differential from about 0.5° C. to 7.0° C. This added external heat input to the cell significantly increased the wattage output and yield and served as a trigger to facilitate subsequent self-sustaining heat output action of the cell. This self-sustaining action is indicated after the current input was dropped to zero wherein over an elapsed time of approximately thirty (30) minutes, the cell continued to produce a temperature differential of the electrolyte there across in the range of 6.2° C.

Table III herebelow represents a tabularization of actual test results performed on the electrolytic cell shown in FIG. 2 utilizing conductive beads having a styrene D.V.B. core plated with layers of first, nickel (6 to 7 microns thick), then palladium (1 micron thick), and lastly, nickel (0.5 microns thick) as at 36 in FIG. 2 to form the catalytic bed within the electrolytic cell 12. In this experiment, no salt bridge was

TABLE I

| (N/P/N Layered Styrene DVB Core) | | | | | | | | | |
|---|---|---|---|---|---|---|---|---|---|
| Time (min) | ΔT °C. (To-Tin) | T(in) °C. | Amps (A) | Volts (V) | V-1.5 | Flow Rate ml/min | Watts in | Watts out | % Yield |
| 0 | 0.4 | 25.6 | .02 | 2.84 | 1.34 | 17.6 | .026 | 0.49 | 1886. |
| 12 | 0.9 | 25.4 | .02 | 3.00 | 1.50 | 17.6 | .030 | 1.10 | 3678. |
| 32 | 0.9 | 25.3 | .02 | 3.07 | 1.57 | 17.6 | .030 | 1.10 | 3678. |
| 44 | 0.8 | 24.9 | .02 | 3.06 | 1.56 | 16.7 | .030 | 0.93 | 3103. |
| 54 | 0.5 | 25.4 | .02 | 3.07 | 1.57 | 16.7 | .030 | 0.58 | 1939. |
|  | 7.0 | 45.2 | .02 | 2.80 | 1.30 | 17.6 | .026 | 8.58 | 33011. |
| Current to Zero | | | | | | | | | |
| 30 E.T. | 6.2 | 39.0 | .00 | .00 | .00 | 17.0 | .00 | 7.38 | ∞ |

Table II herebelow represents the tabularization of actual test results utilizing steel shot of 2 mm diameter palladium/nickel layered spherical particles as generally at 36 in FIG. 2 to form the catalytic bed within the electrolytic cell 12. The palladium layer had a thickness of approximately 3 microns while the nickel layer thereatop forming the exterior surface of the beads had a thickness of approximately 2 microns.

Here again, an external heat source 21 was utilized to increase the input temperature T(in) of the electrolyte from approximately 24.5° C. to 43.2° C. This added heat triggered a significant increase in the wattage output and percent yield after which the current input across the cell was reduced to zero. The system and cell continued to produce a temperature differential (ΔT) of approximately 5° in the electrolyte passing through the cell resulting in a wattage output of approximately 5.85 watts for the duration of the test of approximately 50 minutes.

utilized within the cell 12; however, in the above two experiments in Tables I and II, a salt bridge was utilized.

In this experiment shown in Table III below, the inlet temperature (Tin) of the electrolyte was maintained at about 45° C. and, after twenty four (24) hours, the current was reduced to zero. However, the experimental cell continued to produce a decaying positive differential temperature (ΔT) of the electrolyte passing through the cell for a period of an additional thirty eight (38) hours during which time a positive wattage; output was observed.

TABLE II

| (Steel Shot Core, Pd/Ni Coated Spherical Particles) | | | | | | | | | |
|---|---|---|---|---|---|---|---|---|---|
| Time (min) | ΔT °C. (To-Tin) | T(in) °C. | Amps (A) | Volts (V) | V-1.5 | Flow Rate ml/min | Watts in | Watts out | % Yield |
| 0 | 0.4 | 23.7 | .02 | 4.20 | 2.70 | 16.7 | .050 | 0.467 | 935. |
| 4 | 0.5 | 23.7 | .02 | 6.22 | 4.72 | 16.7 | .090 | 0.584 | 649. |
| 10 | 0.6 | 23.9 | .02 | 5.82 | 4.32 | 15.7 | .086 | 0.659 | 767. |
| 14 | 0.6 | 23.9 | .02 | 5.93 | 4.43 | 16.7 | .088 | 0.701 | 799. |
| 20 | 0.7 | 24.0 | .02 | 5.65 | 4.15 | 15.7 | .080 | 0.769 | 962. |
| 40 | 0.8 | 24.4 | .02 | 5.55 | 4.05 | 15.7 | .080 | 0.879 | 1099. |
| 52 | 0.5 | 24.6 | .02 | 5.49 | 3.99 | 16.7 | .079 | 0.584 | 790. |
| 62 | 0.8 | 24.5 | .02 | 5.25 | 3.75 | 16.7 | .075 | 0.935 | 1247. |
| 84 | 8.8 | 40.5 | .015 | 4.58 | 3.08 | 16.7 | .040 | 10.28 | 22251. |
| 96 | 9.0 | 43.2 | .015 | 4.38 | 2.88 | 16.7 | .040 | 10.52 | 24354. |
| 110 | 10.4 | 43.2 | .010 | 4.10 | 2.70 | 15.7 | .027 | 11.43 | 42333. |
| Current to Zero | | | | | | | | | |
| 50 E.T. | 5.0 | 38.2 | .00 | .00 | .00 | 16.7 | .00 | 5.85 | ∞ |

TABLE III (N-P-N Layered Styrene D.V.B. Core)

| Time (hrs) | ΔT °C. (To-Tin) | T(in) °C. | Amps (A) | Volts (V) | V-1.5 | Flow Rate ml/min | Watts in | Watts out | % Yield |
|---|---|---|---|---|---|---|---|---|---|
| 0 | 2.3 | 45.2 | .02 | 2.98 | 1.48 | 14.3 | .0596 | 2.0 | 3356. |
| 12 | 2.2 | 45.3 | .02 | 2.99 | 1.48 | 14.3 | .0598 | 2.2 | 3679. |
| 24 | 2.2 | 45.2 | .02 | 2.98 | 1.48 | 14.3 | .0596 | 2.2 | 3691. |
| 25 | 1.8 | 45.2 | .00 | .00 | 0.00 | 14.3 | .00 | 1.8 | ∞ |
| 26 | 1.5 | 45.3 | .00 | .00 | 0.00 | 14.3 | .00 | 1.5 | ∞ |
| 27 | 1.1 | 45.2 | .00 | .00 | 0.00 | 14.3 | .00 | 1.1 | ∞ |
| 28 | 1.0 | 45.1 | .00 | .00 | 0.00 | 14.3 | .00 | 1.0 | ∞ |
| 30 | 0.8 | 45.3 | .00 | .00 | 0.00 | 14.3 | .00 | 0.8 | ∞ |
| 36 | 0.05 | 45.2 | .00 | .00 | 0.00 | 14.3 | .00 | 0.5 | ∞ |
| 48 | 0.04 | 45.2 | .00 | .00 | 0.00 | 14.3 | .00 | 0.4 | ∞ |
| 60 | 0.03 | 45.3 | .00 | .00 | 0.00 | 14.3 | .00 | 0.3 | ∞ |
| 72 | .02 | 45.3 | .00 | .00 | 0.00 | 14.3 | .00 | 0.2 | ∞ |

An experimental cell was provided on a strictly confidential basis to the automotive and industrial electronics group of Motorola for evaluation. This experimental cell utilized beads formed of styrene divinyl benzene spherical cores having a nickel layer thereatop of approximately 6 to 7 microns thickness, a palladium intermediate layer having a thickness of approximately 1.4 microns and an outer nickel layer of approximately 0.6 microns in thickness. This cell was test run by Motorola in a broad range of operating conditions, one such test run ending at an input temperature of approximately 59° C., and a current applied across the cell of approximately 0.02 amps after which the current was reduced to zero. For a period of approximately 14 hours thereafter, a differential temperature of approximately 15.9° C., was maintained as shown in Table IV herebelow.

TABLE IV (Motorola Verification)

| Elapsed Time (hrs) | ΔT °C. (To-Tin) | T(in) °C. | Amps (A) | Volts (V) | V-1.5 | Flow Rate ml/min | Watts in | Watts out | % Yield |
|---|---|---|---|---|---|---|---|---|---|
| 14 | 15.9 | 58.9 | .00 | 0.1284 | 0.00 | 20.0 | .00 | 22.26 | ∞ |

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A system for heating of a liquid electrolyte comprising:

an electrolytic cell including a non-conductive housing and an inlet and an outlet;

a first conductive foraminous grid positioned within said housing adjacent to said inlet;

a second conductive foraminous grid positioned within said housing spaced from said first conductive grid and adjacent to said outlet;

a plurality of conductive particles each including a conductive metal which will combine with hydrogen or an isotope of hydrogen to form a metallic hydride or deuteride, said plurality of conductive particles positioned between said first and second grids in electrical communication with said first grid and electrically isolated from said second grid;

means for pumping said liquid electrolyte into said electrolytic cell through said inlet said electrolyte having a conductive salt in solution with water;

means external to said cell for heating said electrolyte prior to entry into said electrolytic cell.

2. A system as set forth in claim 1, further comprising:

means operably connected to said first and second grids for applying an electrical current flow between said first and second grids during an initial hydrogen charging of said conductive particles.

3. A system as set forth in claim 1, wherein said electrolytic cell further comprises:

a plurality of non-conductive particles positioned within said housing adjacent said second grid;

a foraminous non-conductive mesh positioned within said housing between said conductive particles and said non-conductive particles to prevent said conductive particles from contacting said second grid.

4. A system as set forth in claim 1, wherein:

said conductive metal is taken from the group consisting of palladium, nickel, lanthanum, praseodymium, cerium, titanium, zirconium, vanadium, tantalum, uranium, hafnium and thorium.

5. A system as set forth in claim 1, further comprising:

a plurality of non-metallic particles each having a sulfonated surface which has been ion exchanged with a lithium salt;

said plurality of non-metallic particles positioned between said second grid and said conductive particles and forming a conductive salt bridge thereacross.

6. A system for producing excess heat within liquid electrolyte for use externally from said system, comprising:

an electrolytic cell including a non-conductive housing and an inlet and an outlet;

a first conductive foraminous grid positioned within said housing adjacent to said inlet;

a second conductive foraminous grid positioned within said housing spaced from said first conductive grid and adjacent to said outlet;

plurality of conductive particles each including a conductive metal which is readily combineable will combine with hydrogen or an isotope of hydrogen to form a metallic hydride or deuteride, said plurality of conductive particles positioned between said first and second grids in electrical communication with said first conductive grid and electrically isolated from said second grid;

means for circulating said liquid electrolyte through said electrolytic cell through said inlet said electrolyte having a conductive salt in solution with water;

means operably connected to said first and second grid for applying a low level electrical current flow between said first and second grids during an initial hydrogen chaining of said conductive particles;

means external to said cell for heating said, liquid electrolyte prior to entering said cell.

7. A system as set forth in claim 6, wherein said electrolytic cell further comprises:

a plurality of non-conductive particles positioned within said housing adjacent said second grid;

a foraminous non-conductive mesh positioned within said housing between said conductive particles and said non-conductive particles to prevent said conductive particles from contacting said second grid.

8. A system as set forth in claim 6, wherein:

said conductive metal is taken from the group consisting of palladium, nickel, lanthanum, praseodymium, cerium, titanium, zirconium, vanadium, tantalum, uranium, hafnium and thorium.

9. A system as set forth in claim 6, further comprising:

plurality of non-metallic particles each having a sulfonated surface which has been ion exchanged with a lithium salt;

said plurality of non-metallic particles positioned between said second grid and said conductive particles and forming a conductive salt bridge thereacross.

10. A system for self-sustained heating of a liquid electrolyte for external use of excess heat unrelated to said system., comprising:

an electrolytic cell including a non-conductive housing and an inlet and an outlet;

a first conductive foraminous grid positioned within said housing adjacent to said inlet;

a second conductive foraminous grid positioned within said housing spaced from said first conductive grid and adjacent to said outlet;

plurality of conductive particles each including a conductive metal which will combine with hydrogen or an isotope of hydrogen to form a metallic hydride or deuteride, said plurality of conductive particles positioned between said first and second grids in electrical communication with said first grid and electrically isolated from said second grid;

means for pumping said liquid electrolyte into and through said electrolytic cell, said electrolyte having a conductive salt in solution with water;

means operably connected to said first and second grids for applying an electrical current flow between said first and second grid during an initial hydrogen charging of and heating of said liquid electrolyte by, said conductive particles.

11. A system as set forth in claim 10, further comprising:

means external to said cell for heating said liquid electrolyte before entry into said cell.

12. A system as set forth in claim 10, wherein said electrolytic cell further comprises:

plurality of non-conductive particles positioned within said housing adjacent said second grid;

a foraminous non-conductive mesh positioned within said housing between said conductive particles and said non-conductive particles to prevent said conductive particles from contacting said second grid.

13. A system as set forth in claim 10, wherein:

said conductive metal is taken from the group consisting of palladium, nickel, lanthanum, praseodymium, cerium, titanium, zirconium, vanadium, tantalum, uranium, hafnium and thorium.

14. A system as set forth in claim 10, further comprising:

a plurality of non-metallic particles each having a sulfonated surface which has been ion exchanged with a lithium salt;

said plurality of non-metallic particles positioned between said second grid and said conductive particles and forming a conductive salt bridge thereacross.

* * * * *

UNITED STATES PATENT AND TRADEMARK OFFICE
CERTIFICATE OF CORRECTION

PATENT NO. : 5,628,886
DATED : May 13, 1997
INVENTOR(S) : James A. Patterson

It is certified that error appears in the above-indentified patent and that said Letters Patent is hereby corrected as shown below:

Column 10, line 24, after "inlet", insert -- , --.
Column 10, line 64, after "within", insert -- a --.
Column 11, line 6, before "plurality", insert -- a --.
Column 11, line 7, delete -- is readily combineable --.
Column 11, line 15, delete -- through said inlet --.
Column 11, line 17, rewrite "grid" as -- grids --.
Column 11, line 20, rewrite "chaining" as -- charging --.
Column 11, line 37, before "plurality", insert -- a --.
Column 12, line 6, before "plurality", insert -- a --,
Column 12, line 26, before "plurality", insert -- a --.

Signed and Sealed this

Fifth Day of August, 1997

Attest:

BRUCE LEHMAN

*Attesting Officer*  *Commissioner of Patents and Trademarks*